United States Patent
Menezes et al.

(10) Patent No.: US 8,793,167 B2
(45) Date of Patent: Jul. 29, 2014

(54) ACCOUNT CONVERSION OF INFORMATION TECHNOLOGY SYSTEMS

(75) Inventors: Jerold Menezes, Irving, TX (US); Shankar Arumugavelu, Warren, NJ (US); Harish Korapati, Irving, TX (US); Viswanadha R. Sontam, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 936 days.

(21) Appl. No.: 12/827,751

(22) Filed: Jun. 30, 2010

(65) Prior Publication Data

US 2012/0005614 A1    Jan. 5, 2012

(51) Int. Cl.
*G06Q 40/00* (2012.01)
(52) U.S. Cl.
USPC .......................................... 705/30
(58) Field of Classification Search
None
See application file for complete search history.

*Primary Examiner* — Shay S Glass (57) ABSTRACT

A device may convert accounts maintained by a first information technology system to a second information technology system. In one implementation, the device may convert a first set of attributes corresponding to an account in the first information technology system to a second set of attributes corresponding to the account in the second information technology system. The device may validate the second set of attributes by converting the second set of attributes back to a third set of attributes corresponding to the account in the first information technology system.

21 Claims, 8 Drawing Sheets

ACCOUNT CONVERSION OF INFORMATION TECHNOLOGY SYSTEMS

BACKGROUND

A company or other entity may use a number of internal systems to manage operation of the business in which the company operates. For example, a company may use a billing system, a payment processing system, and a service provisioning system. In some situations, a company may have multiple, different systems that perform the same function. A company may, for instance, acquire another company that has a different billing system. Maintaining and supporting different systems that perform the same function can be burdensome. Accordingly, it can be desirable to merge the systems into a single system.

For large systems, merging or combining multiple different systems may be a difficult task. The different systems may use different data models and support different functionality. Further, the different systems may include inconsistent or inaccurate information. Merging or combining these types of systems can be particularly difficult in environments in which the systems are business-critical systems that need to have high uptime.

DETAILED DESCRIPTION

The following detailed description of the invention refers to the accompanying drawings. The same reference numbers in different drawings may identify the same or similar elements. Also, the following detailed description does not limit the invention.

Implementations described herein may include techniques for converting accounts in a first business system to a second business system. The first and second business systems may be redundant in that they may have both been designed to fulfill the same function. Despite this, the first and second business systems may implement different data models and/ or different processes that are used to perform the desired function. Conversion between the first and second business systems may include an initial conversion procedure in which accounts in the first business system are mapped to the second business system. A validation process may be performed to verify a correct mapping. The validation may include a "reverse" conversion in which the converted accounts are converted back to a format of the first business system and then compared to the original objects in the first business system.

As used herein, the term "business system" may include any combination of databases, servers, processes, or protocols used to accomplish a business objective. One example of a business system is a billing system that may store user account or service information and handle processes such as invoice generation, payment tracking, rebate tracking, etc. The billing system may be a physically distributed system implemented by a number of computer devices.

Figure 1:
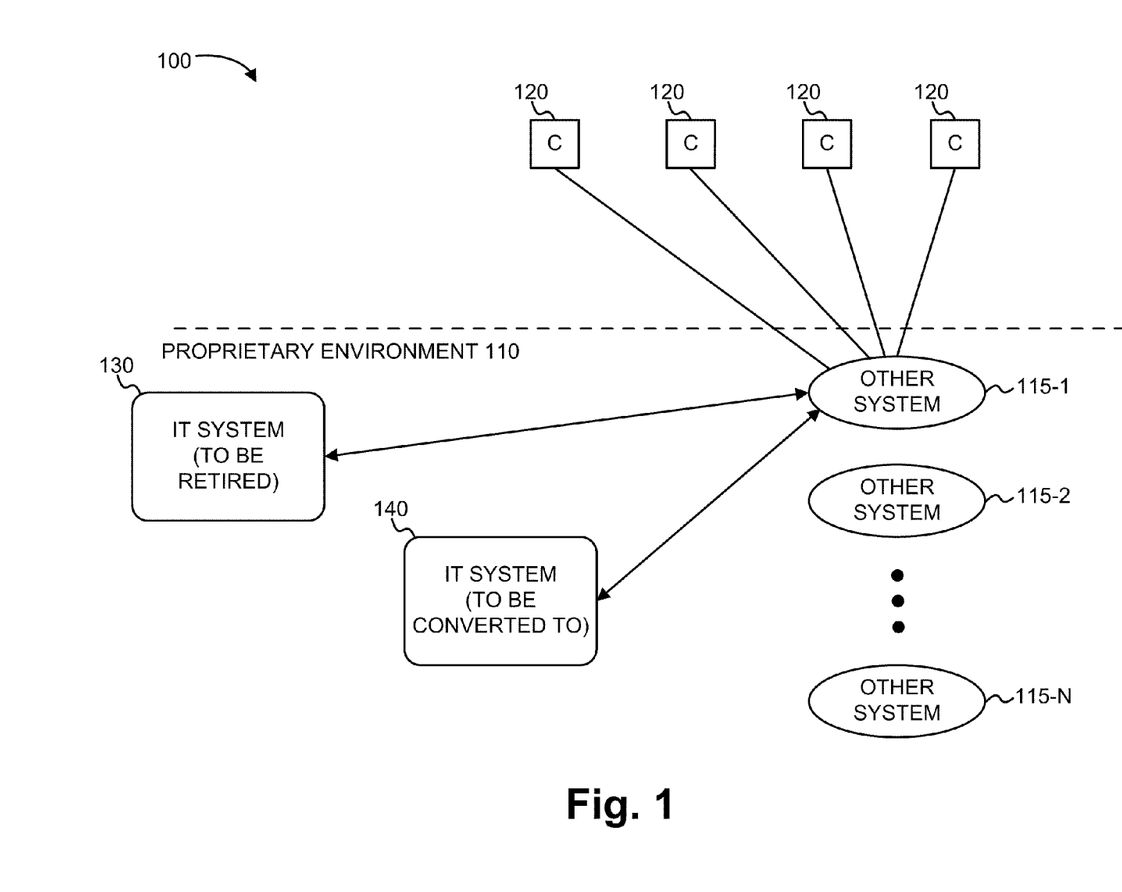
FIG. 1 is a diagram illustrating an example system in which concepts described herein may be implemented.

FIG. 1 is a diagram illustrating an example system 100 in which concepts described herein may be implemented. System 100 may include a proprietary environment 110, which may represent computing systems used by a corporation or another entity. Proprietary environment 110 may include, for example, one or more private local area networks (LANs). The entity that runs proprietary environment 110 may interact with customers (C) 120. For example, proprietary environment 110 may include billing systems, data mining systems, web servers, call center support systems, order tracking systems, or other systems that may interact with or be used to interact with customers 120.

The computing systems illustrated for proprietary environment 110, as particularly shown in FIG. 1, may include an information technology (IT) system 130 (also referred to as system 130 or "old" system 130 herein) and an IT system 140 (also referred to as system 140 or "new" system 140 herein). System 130 may particularly represent a computing system that is to be retired and the information contained in system 130 may be transferred to system 140. To perform the conversion from system 130 to system 140, the data stored in system 130 may need to be converted to a format compatible with system 140. For example, the data models and formats used by system 130 may need to be converted into a format supported by system 140.

Additional computing systems, labeled as other systems 115-1 through 115-N, are also shown in FIG. 1. Systems 115-1 through 115-N may each represent another type of computing system used by the entity that operates proprietary environment 110. One or more of systems 115 may interact with systems 130/140 and/or customers 120.

In some situations, systems 130/140 may be large systems, potentially storing and processing accounts for millions of customers. It may be desirable to convert from system 130 to system 140 in a manner that maintains high availability of the customer accounts.

FIG. 1 shows an example of components that may be included in a system 100. In other implementations, system 100 may include fewer, different, differently arranged, or additional components than depicted in FIG. 1. Alternatively or additionally, one or more components of system 100 may perform one or more tasks described as being performed by one or more other components of system 100.

Figure 2:
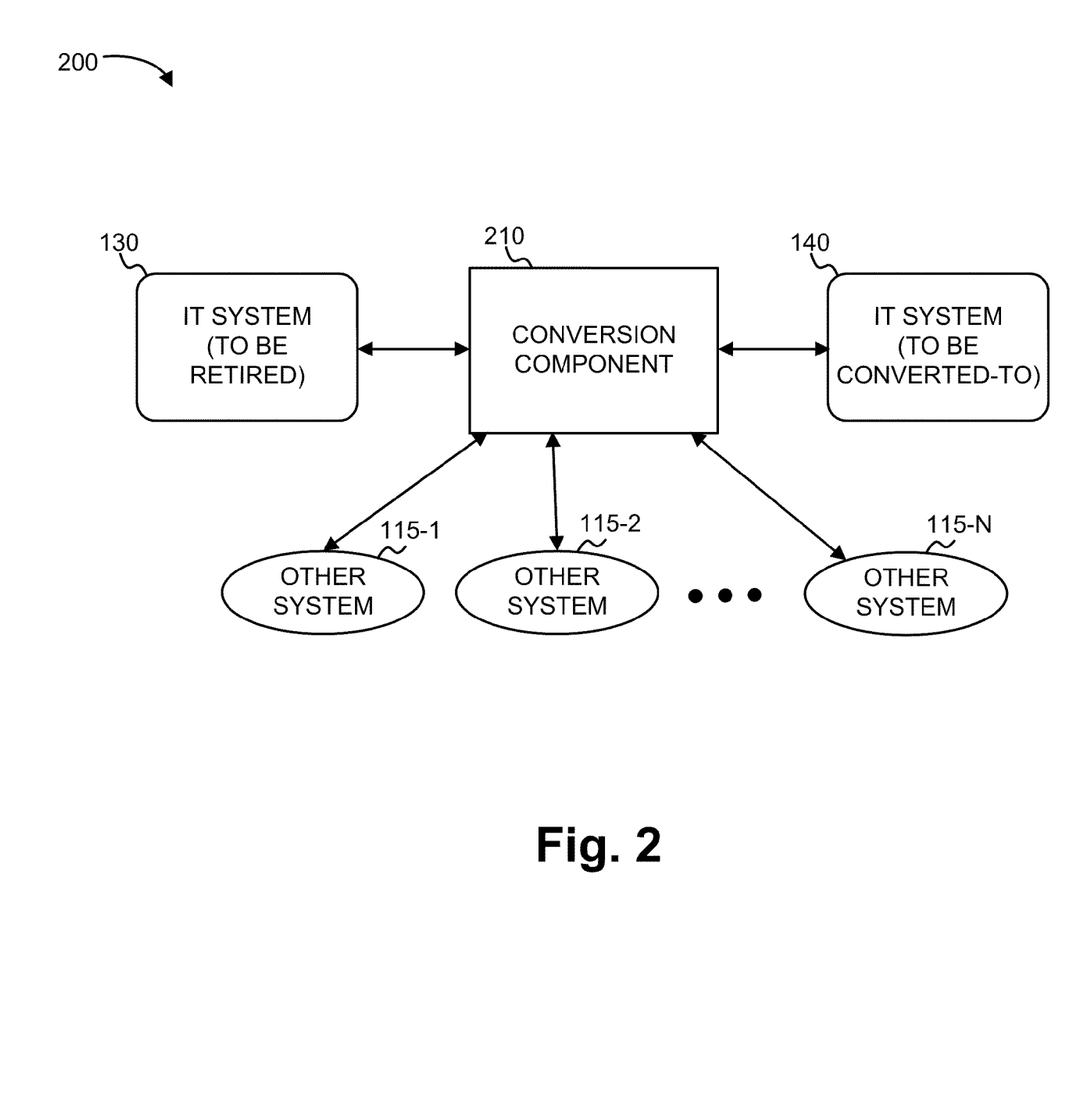
FIG. 2 is a block diagram conceptually illustrating a system for converting information technology systems.

FIG. 2 is a block diagram conceptually illustrating a system 200 for converting IT systems, such as for converting the accounts in IT system 130 into IT system 140. System 200 may include a conversion component 210. Conversion component 210 may include one or more computing devices and software designed to perform the conversion. Conversion component 210 may be coupled to IT systems 130 and 140. In general, conversion component 210 may read data structures from system 130, convert values and/or data objects in system 130 into a format useable by system 140, and write the converted information to system 140. Conversion component 210 may also validate the values and/or data objects written to system 140 and perform a rollback operation when a validation fails.

Conversion component 210 may additionally communicate with other systems 115. Conversion component 210 may, for example, obtain additional information, needed as part of the conversion, from other systems 115, or use other systems 115 in performing the validation.

Figure 3:
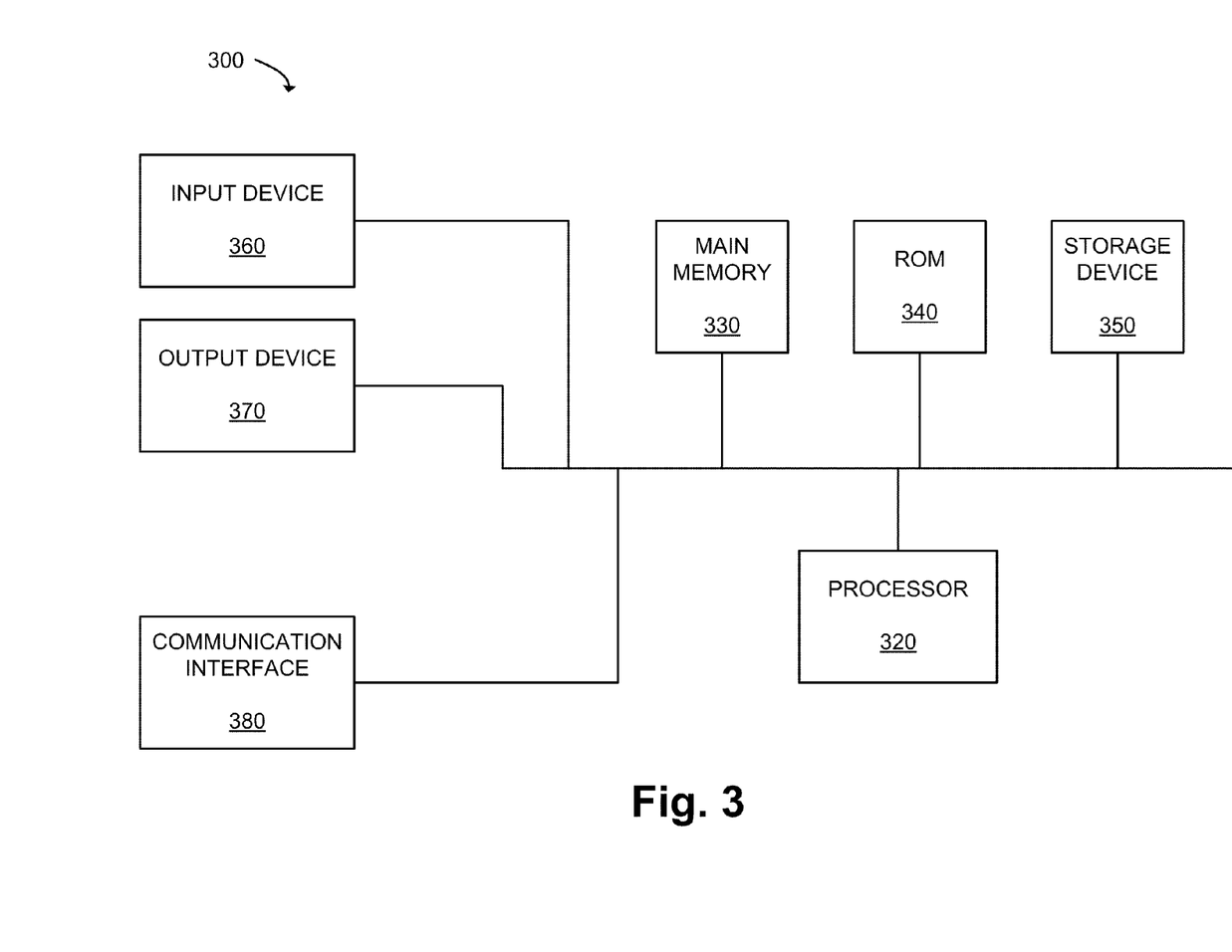
FIG. 3 is a diagram illustrating example components of a computing device.

FIG. 3 is a diagram illustrating example components of a computing device 300. Computing device 300 may be used to implement conversion component 210 and/or one or more of systems 115, 130, and/or 140. In some implementations, multiple computing devices 300 may be coupled together, either locally or in a physically distributed manner, to implement conversion component 210 and/or systems 115, 130, and/or 140. As shown in FIG. 3, computing device 300 may include a processor 320, a main memory 330, a read only memory (ROM) 340, a storage device 350, an input device 360, an output device 370, and a communication interface 380.

Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to computing device 300, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables computing device 300 to communicate with other devices and/or systems. For example, communication interface 380 may include mechanisms for communicating with another network device.

As will be described in detail below, computing device 300 may perform certain operations relating to IT system conversion. Computing device 300 may perform these and other operations in response to processor 320 executing software instructions contained in a computer-readable medium, such as main memory 330. A computer-readable medium may be defined as a logical or physical memory device. A logical memory device may include a space within a single physical memory device or spread across multiple physical memory devices. The software instructions may be read into main memory 330 from another computer-readable medium or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 3 shows an example of components that may be included in computing device 300. In other implementations, computing device 300 may include fewer, different, differently arranged, or additional components than depicted in FIG. 3. Alternatively or additionally, one or more components of computing device 300 may perform one or more tasks described as being performed by one or more other components of computing device 300.

Figure 4:
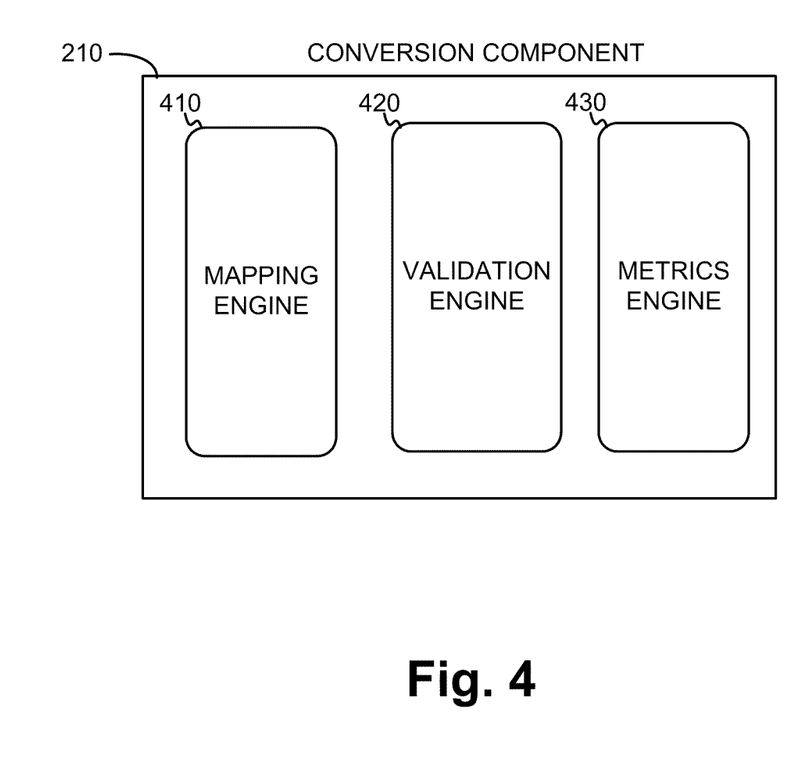
FIG. 4 is a diagram illustrating an example of functional components included in a conversion component depicted in FIG. 2.

FIG. 4 is a diagram illustrating an example of functional components included in conversion component 210. Conversion component 210 may include a mapping engine 410, a validation engine 420, and a metrics engine 430. In general, mapping engine 410 may provide a mapping of each of the account attributes in system 130 (the IT system that is to be retired) to an account of IT system 140 (the IT system that is to be used in place of IT system 130). A mapping function may be determined for each attribute of the account in systems 130 and/or 140 by, for example, manual analysis performed by an administrator. Validation engine 420 may perform a check of whether a converted account was accurately converted. Metrics engine 430 may maintain status information relating to the mapping and validation of accounts. Mapping engine 410, validation engine 420, and metrics engine 430 will be described in more detail below.

Figure 5:
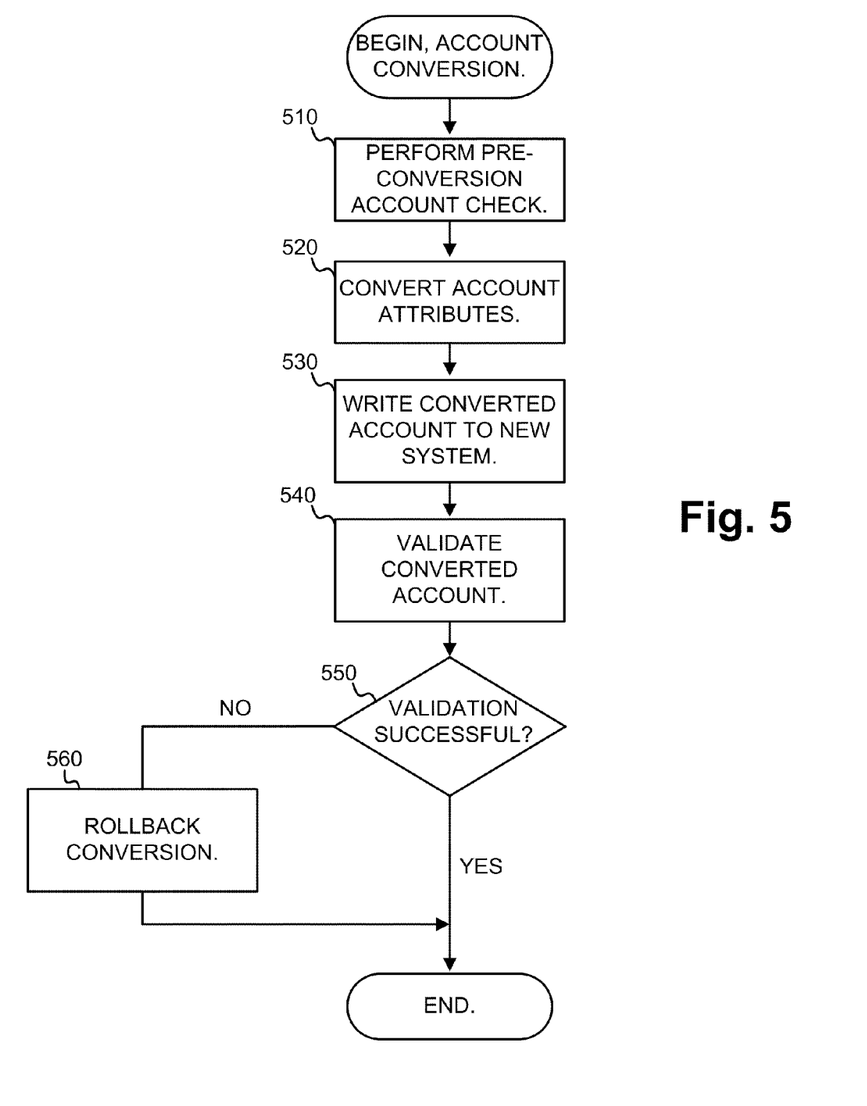
FIG. 5 is a flow chart illustrating an example of a process for converting between two information technology systems.

FIG. 5 is a flow chart illustrating an example of a process 500 for converting between two IT systems. The two IT systems may both be systems that generally perform the same business process. For example, the IT systems may be two different billing systems for which a company desires to consolidate all billing processes to one of the two systems. In the description that follows, the IT system that is being retired will be referred to as "old" system 130 and the system that is receiving the accounts from the old system will be referred to as "new" system 140. In practice, old system 130 may or may not be chronologically older than new system 140.

Process 500 may initially include performing a pre-conversion account check (block 510). The pre-conversion account check may examine the account in old system 130 to determine whether the account is an account that is ready for conversion. Whether an account is ready for conversion may be based on criteria applied to the account. For example, the criteria may specify that accounts associated with pending orders are not to be converted. An account with a pending order may "drop out" (i.e., be excluded from) the conversion process at this check. In some implementations, conversion component 210 may contact other systems 115 in determining whether an account is ready for conversion. For example, conversion component 210 may query other systems 115 to verify that the information stored by other systems 115 and that relates to the account does not contain errors.

Process 500 may further include converting the account attributes relating to the account, as stored in old system 130, into a format suitable for new system 140 (block 520). The conversion may generally include mapping all of the attributes of the account in old system 130 to corresponding attributes for the account in new system 140.

Figure 6:
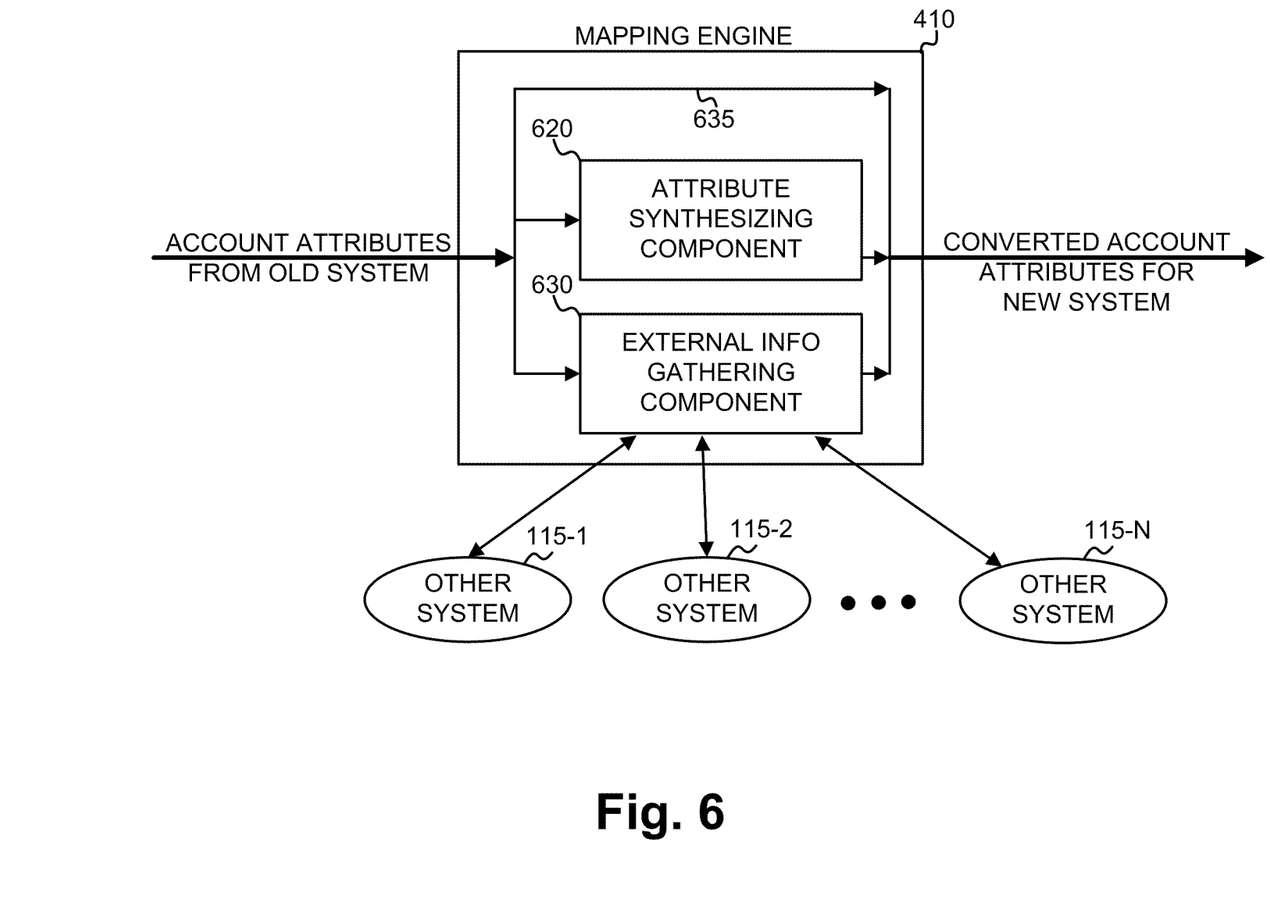
FIG. 6 is a diagram conceptually illustrating conversion of account attributes.

FIG. 6 is a diagram conceptually illustrating the conversion of account attributes, as performed in block 520. The conversion of the account attributes may be performed by mapping engine 410. In general, mapping engine 410 may convert the attributes of an account from old system 130 to attributes that are compatible with new system 140. The conversion performed by mapping engine 410 may be based on rules that are coded by designers based on an analysis of old system 130 and new system 140.

As shown in FIG. 6, mapping engine 410 may conceptually include an attribute synthesizing component 620 and an external information (info) gathering component 630. Some attributes that are stored in old system 130 may map directly from old system 130 to new system 140. For example, for a billing system, an account outstanding balance value may be maintained by both old system 130 and new system 140. This value may therefore directly map to new system 140 without additional processing. Attributes that are directly mappable between old system 130 and new system 140 are illustrated in FIG. 6 by path 635 through mapping engine 410. Account attributes that are not directly mappable between old system 130 and new system 140 may be converted using one or both of attribute synthesizing component 620 and external information gathering component 630.

Attribute synthesizing component 620 may operate to generate an account attribute for new system 140 based on a function of one or more account attributes from old system 130. For example, some account attributes may need to be processed before being converted. A date value, for example, may be stored in a different format at old system 130 and new system 140. Other account attributes for new system 140 may be generated based on multiple account attributes from old system 130. For example, new system 140 may include an account attribute that is not directly stored by old system 130. New system 140 may calculate the account attribute based on a combination of attributes from old system 130, such as a combination based on a sum of attributes, multiplication of attributes, or some other function.

External information gathering component 630 may obtain information from one of more of other systems 115. In some implementations, new system 140 may include account attributes that cannot be derived solely from the information in old system 130. In this case, additional information, such as information stored in one or more of other systems 115, may need to be obtained. The information obtained from other systems 115 may be used by itself to generate attributes for new system 140 or may be used by attribute synthesizing component 620 in generating account attributes for new system 140. In some situations, information obtained from different other systems 115 and/or old systems 130 may conflict. In this situation, for a particular account attribute, one of other systems 115 or old system 130 may be designated as the authoritative system and the value obtained from the authoritative system may be used.

In one implementation, conversion of the account attributes may be performed in stages. For example, the attributes relating to a profile of the user of the account (e.g., the user name, user address, and services to which the user subscribes) may be first converted. System specific information may be converted after the profile information. System specific information may include information relating to the task being performed by systems 130 and 140. For example, for a billing system, system specific information may include the account balances, credits, billing adjustments, etc.

During conversion of the account attributes, mapping engine 410 may encounter conversion errors. Accounts for which conversion errors occur may be excluded from the conversion process. In this manner, for a group of accounts that are initially put through the conversion process, the number of accounts in the group being converted may decrease as certain ones of the accounts are excluded from the conversion process.

Referring back to FIG. 5, after the conversion of the account attributes (FIG. 5, block 520; and FIG. 6), the converted account attributes may be written to new system 140 (block 530). In some implementations, converted attributes may be written to new system 140 on an attribute basis (i.e., as each attribute is converted) as opposed to writing all attributes for an account at once. At this point, the converted account may be active in new system 140. In some situations, the status or location of the account may be marked in one or more of other systems 115 to indicate that the account is active in new system 140. For example, when the converted account is written to new system 140, and systems 130 and 140 are billing systems, other systems 115 may be updated to indicate that new system 140 is the billing system associated with the account.

Process 500 may further include validating a converted account (block 540). Validating a converted account may be performed by validation engine 420 and may include an automated validation of each of the converted account attributes. In one implementation, validation engine 420 may convert the account attributes from new system 140 back to the account attribute for old system 130. For example, validation engine 420 may map all of the attributes of the account in new system 140 to corresponding attributes for the account in old system 130. The mapping may be based on rules that are coded by designers based on an analysis of old system 130 and new system 140. In one implementation, the rules used for the mapping may reverse the mapping performed by mapping engine 410. For example, account attributes for old system 130 may be determined by: directly mapping the attributes from new system 140, synthesizing the attributes based on a combination of attributes in new system 140, or based on additional information from other systems 115.

A successful validation may be one in which the account, when converted from a format of new system 140 and then back to a format of old system 130, matches the original account in old system 130. Validation engine 420 may thus compare the original attributes of the account from old system 130 to the converted-back set of attributes for old system 130. Process 500 may further include, when the validation was not successful (block 550—NO), such as when the converted-back attributes do not match the original attributes, rolling back the conversion (block 560). Rolling back the conversion may include reverting any changes in the conversion process in old system 130, new system 140, and/or other systems 115 to a state from before the conversion. In one implementation, the rollback operation may be performed based on a rollback file that is created during conversion and that logs each of the changes made during the conversion.

In some implementations, instead of performing the validation operation after fully converting an account, validation may be performed in parallel with account attribute conversion. For example, after an initial set of account attributes are converted, validation may be started for those account attributes. Performing attribute conversion and validation in parallel may decrease the total conversion time for the account, which can be beneficial in situations in which it is desirable for the account to be offline for as short a period as possible.

In the process of FIG. 5, results obtained by mapping engine 410 and validation engine 420 may be output to metrics engine 430 as the results are obtained. In one implementation, metrics engine 430 (or another component that uses conversion status information stored by metrics engine 430) may graphically present results for the conversion of a set of accounts in real-time. Metrics engine 430 may display, for example, the number of accounts that have been successfully converted, the portion of the accounts that are excluded in pre-conversion, the portion of the accounts that are excluded during conversion, and the portion of the accounts that fail validation. Metrics engine 430 may also present the reason or error information describing why the conversion failed. In other implementations, metrics engine 430 may display additional information. In general, through metrics engine 430, an administrator may monitor the status of a conversion of a number of accounts. The administrator may use the results presented by metrics engine 430 to determine changes or enhancements that need to be made to mapping engine 410 or validation engine 420. For example, if a certain type of account or certain attribute of an account consistently fails to properly convert, the administrator may decide to re-work the logic of mapping engine 410 that pertains to that type of account or attribute.

Figure 7:
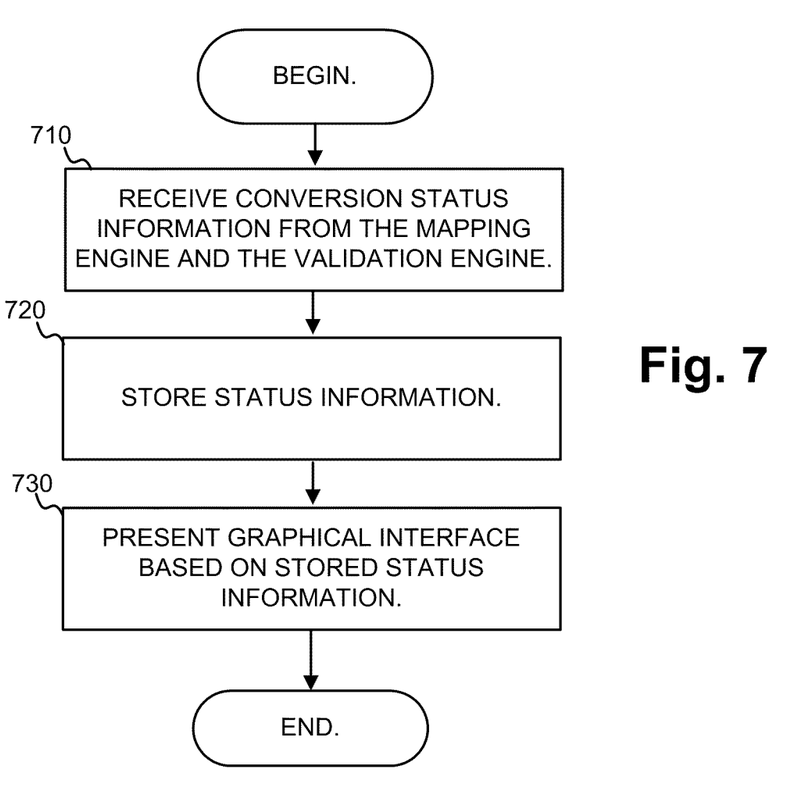
FIG. 7 is a flow chart illustrating an example of a process for presenting results of a conversion to an administrator.

FIG. 7 is a flow chart illustrating an example of a process 700 for presenting results of a conversion to an administrator.

Process 700 may include receiving conversion status information from mapping engine 410 and/or validation engine 420 (block 710). Mapping engine 410 and validation engine 420 may output status information at each stage of the conversion. For example, when accounts are excluded from the conversion process, such as accounts that drop out during the pre-conversion account check (FIG. 5, block 510) or the conversion of the account attributes (FIG. 5, block 520), mapping engine 410 may output an indication of the accounts that are excluded and the reason why the accounts are excluded. Similarly, validation engine 420 may output information indicating which accounts pass or fail validation.

Process 700 may further include storing the received status information (block 720). In one implementation, the status information may be stored as one or more tables that are stored by metrics engine 420. In other implementations, the status information may be stored at a different device or in a different format.

Process 700 may further include presenting a graphical interface based on the stored status information (block 730). In one implementation, the graphical interface may be a graphical interface presented through a web browser. For example, conversion component 210 may include a web server designed to generate web pages based on the stored status information. In other implementations, another locally or remotely connected computing device may act as a web server used to generate the graphical interface. In still other implementations, the graphical interface may be generated using application environments other than through a web browser. The graphical interface may generally be designed to keep administrators apprised of the status of a conversion.

Figure 8:
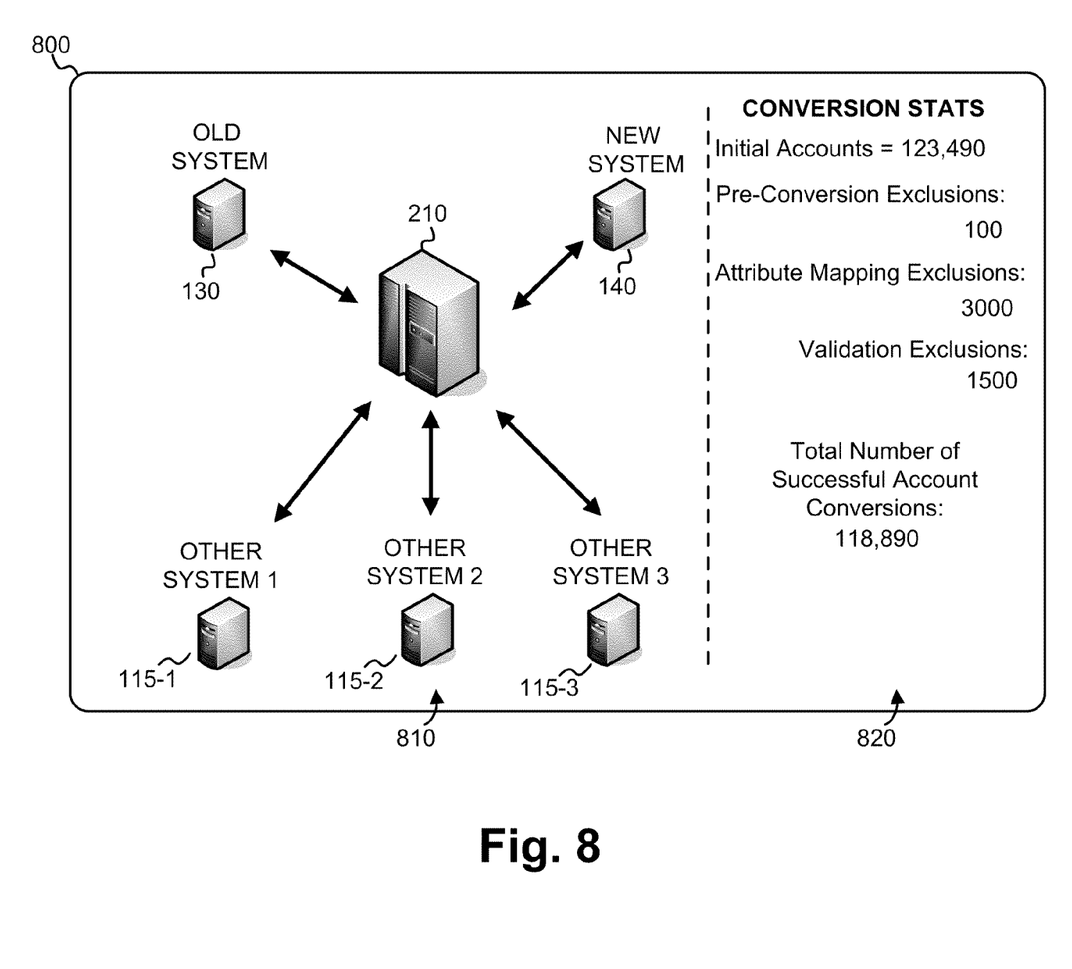
FIG. 8 is a diagram illustrating an example graphical interface.

FIG. 8 is a diagram illustrating an example graphical interface 800, such as a graphical interface that may be presented as part of block 730 of process 700.

Graphical interface 800 may include a first section 810 and a second section 820. First section 810 may graphically illustrate the IT systems involved in the conversion. As particularly shown, conversion component 210, old system 130, new system 140, and other systems 115-1, 115-2, and 115-3 may be graphically illustrated in first section 810. In some implementations, graphical arrows or other graphical symbols may be displayed or not displayed to indicate communication between conversion component 210 and the illustrated systems. Second section 820 may display statistics relating to the conversion. The statistics may be derived from the status information received for the conversion. In the illustrated example, a conversion operation was attempted on 123,490 accounts. Of these, one-hundred (100) accounts were excluded during pre-conversion. An additional 3000 accounts are shown as being excluded during mapping and 1500 accounts are shown as being excluded during validation. As is further shown, the number of successful accounts converted is 118,890.

In one implementation, graphical interface 800 may be updated in real-time as accounts are converted. Graphical interface 800 may then present real-time snapshots of the state of a conversion.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 5 and 7, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code--it being understood that software and control hardware may be designed to implement the embodiments based on the description herein.

Further, certain portions, described above, may be implemented as a component or logic that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   converting, by the computing device, a first set of attributes corresponding to an account in a first information technology system to a second set of attributes corresponding to the account in a second information technology system;
   creating, by the computing device, a rollback file to log changes to the first set of attributes associated with the converting;
   validating, by the computing device, the second set of attributes by using reverse mapping to convert the second set of attributes for the second information technology system to a third set of attributes corresponding to the account in the first information technology system;
   determining, by the computing device, that the validation is successful when the first set of attributes matches the third set of attributes;
   outputting, by the computing device, an indication of successful account conversion when the validation is successful;
   reverting, by the computing device and using the rollback file, the changes to the first set of attributes to a state before the converting when the first set of attributes and the third set of attributes do not match; and
   outputting, by the computing device, an indication of an unsuccessful account conversion when the validation is unsuccessful.

2. The method of claim 1, further comprising:
   writing the second set of attributes to the second information technology system; and updating other information technology systems to indicate that the second information technology system is an active information technology system.

3. The method of claim 1, where the first and second information technology systems are different information technology systems that fulfill a same or similar function.

4. The method of claim 1, where status information relating to the conversion of the first set of attributes and the validation of the second set of attributes is stored as the conversion and validation take place.

5. The method of claim 4, further comprising:
generating, based on the status information, a graphical interface that presents a status of the conversion and validation of a plurality of accounts.

6. The method of claim 1, where converting the first set of attributes to the second set of attributes further includes:
synthesizing at least one of the second set of attributes based on a plurality of the first set of attributes.

7. The method of claim 1, where converting the first set of attributes to the second set of attributes further includes:
receiving additional information from at least one other information technology system; and
synthesizing at least one of the second set of attributes based on one or more of the first set of attributes and based on the additional information.

8. The method of claim 1, where the first and second information technology systems are corporate billing systems.

9. The method of claim 1, further comprising:
performing a pre-conversion check in which accounts meeting predetermined criteria are excluded from the conversion, wherein the predetermined criteria include one or more pending orders.

10. The method of claim 9, further comprising:
gathering information, from one or more additional information technology systems, relating to identification of the one or more pending orders.

11. The method of claim 10, where, when values associated with the information gathered from the one or more additional information technology systems or values associated with the first set of attributes conflicts, a value is chosen based on designation of an authoritative system from the one or more additional information technology systems.

12. The method of claim 1, further comprising:
excluding the account from conversion when an error is encountered in the conversion of the first set of attributes.

13. A device comprising:
one or more processors; and
one or more memories, coupled to the one or more processors, the one or more memories storing instructions, that when executed by the one or more processors, cause the one or more processors to:
convert an account of a first information technology system to an account of a second information technology system;
create a rollback file to log changes to the account from a pre-conversion state;
validate the converted account in the second information technology system by using reverse mapping to convert the account back to a format of the first information technology system and comparing the account converted back to the format of the first information technology system to the account of the first information technology system;
write, responsive to successful validation, the converted account to the second information technology system;
update one or more other information technology systems to indicate that the second information technology system is active for the account;
revert, using the rollback file and responsive to unsuccessful validation, the changes to the account to the pre-conversion state; and
update one or more other information technology systems to indicate that the second information technology system is not active for the account.

14. The device of claim 13, where the instructions further cause the one or more processors to:
write attributes associated with the converted account to the second information technology system.

15. The device of claim 13, where the first and second information technology systems are different information technology systems that fulfill a same or similar function.

16. The device of claim 13, where the instructions further cause the one or more processors to:
generate status information relating to the conversion of the account and the validation of the converted account; and
update, based on the status information, a graphical interface that presents the progress of the conversion of a plurality of accounts.

17. The device of claim 13, where the instructions to convert the account further cause the one or more processors to:
synthesize at least one of a plurality of attributes that define the account in the second information technology system using one or more attributes that define the account in the information technology system.

18. The device of claim 13, where the instructions to convert the account further cause the one or more processors to:
receive additional information from at least one other information technology system; and
synthesize at least one of a plurality of attributes that define the account in the second information technology system using one or more attributes that define the account in the information technology system and the additional information.

19. The device of claim 13, where the instructions additionally cause the one or more processors to:
perform a pre-conversion check in which accounts meeting predetermined criteria are excluded from conversion, wherein the predetermined criteria include one or more pending orders.

20. The device of claim 19, where the instructions additionally cause the one or more processors to:
gather information, from one or more additional information technology systems, relating to identification of the one or more pending orders.

21. A device comprising:
means for converting a first set of attributes corresponding to an account in a first information technology system to a second set of attributes corresponding to the account in a second information technology system;
means for creating a rollback file to log changes to the first set of attributes associated with the converting;
means for validating the second set of attributes by using reverse mapping to convert the second set of attributes for the second information technology system to a third set of attributes corresponding to the account in the first information technology system;

means for determining that the validation was successful when the first set of attributes matches the third set of attributes;

means for outputting an indication of successful account conversion when the validation is determined to be successful;

means for reverting, using the rollback file, the changes to the first set of attributes to a state before the converting when the first set of attributes and the third set of attributes do not match; and means for outputting an indication of an unsuccessful account conversion when the validation is determined to not be successful.

\* \* \* \* \*